United States Patent [19]

Yarimizu

[11] Patent Number: 4,550,486

[45] Date of Patent: Nov. 5, 1985

[54] METHOD AND APPARATUS FOR MOUNTING OIL SEAL IN MACHINE HOUSING

[75] Inventor: Kenichi Yarimizu, Fukushima, Japan

[73] Assignee: Nippon Oil Seal Industry Co., Ltd., Tokyo, Japan

[21] Appl. No.: 567,979

[22] Filed: Jan. 4, 1984

[30] Foreign Application Priority Data

Jan. 24, 1983 [JP] Japan .............................. 58-8923[U]

[51] Int. Cl.[4] .............................................. B23P 19/02

[52] U.S. Cl. ........................................ 29/451; 29/235; 29/407; 29/450; 29/525

[58] Field of Search ................. 29/235, 270, 450, 451, 29/525, 407

[56] References Cited

U.S. PATENT DOCUMENTS

| | | | |
|---|---|---|---|
| 2,968,864 | 1/1961 | Lee | 29/235 |
| 3,030,700 | 4/1962 | Jensen | 29/235 X |
| 3,393,439 | 7/1968 | Shriver | 29/235 X |
| 4,286,367 | 9/1981 | Geisinger | 29/235 |

FOREIGN PATENT DOCUMENTS

| | | | |
|---|---|---|---|
| 435087 | 12/1974 | U.S.S.R. | 29/235 |

*Primary Examiner*—Robert C. Watson

*Assistant Examiner*—Steven P. Schad

*Attorney, Agent, or Firm*—Jordan and Hamburg

[57] ABSTRACT

An oil seal mounting jig for mounting an oil seal in a hole formed in the wall of a machine housing, the oil seal being provided on the inner periphery thereof with an annular oil-side tapered surface for contact with the oil to be sealed and an air-side tapered surface having an inclination angle greater than that of the oil-side tapered surface. The oil seal mounting jig has a hollow insertion cylinder opened at its one end and closed at its other end. A hub member for carrying the oil seal is adapted to be slidingly received by the cylinder from the open end of the latter and has an outer peripheral surface of an outside diameter substantially equal to that of a shaft on which the oil seal is to be mounted, one end surface of the hub member having a chamfered portion adapted to abut the oil-side tapered surface of the oil seal. The jig further has a spring disposed between the hub member and the closed end surface of the cylinder and adapted to urge the hub member outwardly of the cylinder, and a stopper for preventing the hub member from coming off from the cylinder due to the urging by the spring.

10 Claims, 4 Drawing Figures

METHOD AND APPARATUS FOR MOUNTING OIL SEAL IN MACHINE HOUSING

BACKGROUND OF THE INVENTION

The present invention relates to a jig for mounting an oil seal in a machine housing. More particularly, the invention is concerned with a jig for mounting an oil seal, capable of automatically preventing, without fail, the oil seal from being fitted in a wrong orientation.

Oil seals are used in machines having a rotary shaft extending through a hole formed in the wall of the machine housing, so as to form an oil-tight seal between the outer peripheral surface of the shaft and the inner peripheral surface of the hole while allowing the shaft to rotate with minimized friction. As will be explained later with reference to the accompanying drawings, the oil seal is unidirectional and has a predetermined orientation. Thus, the oil seal cannot perform its function unless it is mounted in the right orientation. As a matter of fact, however, it is often experienced that the oil seal is mounted in the wrong orientation to cause various troubles, even when the user has paid a specific attention to ensure the right orientation. This problem is serious particularly in the mass-production of the machine employing a manual work for mounting the oil seal, because the mounting of the oil seal in the wrong orientation is inevitable even by the greatest attention paid by the workers. On the other hand, a too much attention in this manual work undesirably lowers the efficiency of the work.

SUMMARY OF THE INVENTION

The present invention aims at obviating the above-described problems of the prior art.

Accordingly, it is a primary object of the invention to provide a jig for mounting a unidirectional oil seal in a machine housing, improved to automatically ensure the right orientation of the oil seal when the latter is received in the hole in the housing wall, thereby to remarkably improve the efficiency of the work for mounting the oil seal.

To this end, according to the invention, there is provided an oil seal mounting jig for mounting an oil seal in a hole formed in the wall of a machine housing such that the outer peripheral surface of the oil seal closely fits in the inner peripheral surface of the hole, the oil seal being provided on the inner periphery thereof with an annular oil-side tapered surface for contact with the oil to be sealed and an air-side tapered surface having an inclination angle greater than that of the oil-side tapered surface, the oil seal mounting jig comprising: a hollow insertion cylinder opened at its one end and closed at its other end; a hub member for carrying the oil seal, the hub member being adapted to be slidingly received in the cylinder from the open end of the latter and having an outer peripheral surface of an outside diameter substantially equal to that of a shaft on which the oil seal is to be mounted, one end surface of the hub member having its peripheral edge chamfered to abut the oil-side tapered surface of the oil seal; a spring means disposed between the hub member and the closed end surface of the cylinder and adapted to urge the hub member outwardly of the cylinder; and a stopper means for preventing the hub member from coming off from the cylinder under the urge of the spring means.

The above and other objects, features and advantages of the invention will become clear from the following description of the preferred embodiment taken in conjuction with the accompanying drawings.

DESCRIPTION OF THE PREFERRED EMBODIMENT

Before turning to the detailed description of the preferred embodiment of the invention, the problem encountered by the prior art will be explained with specific reference to FIG. 1, in order to facilitate the understanding of the invention.

Figure 1:
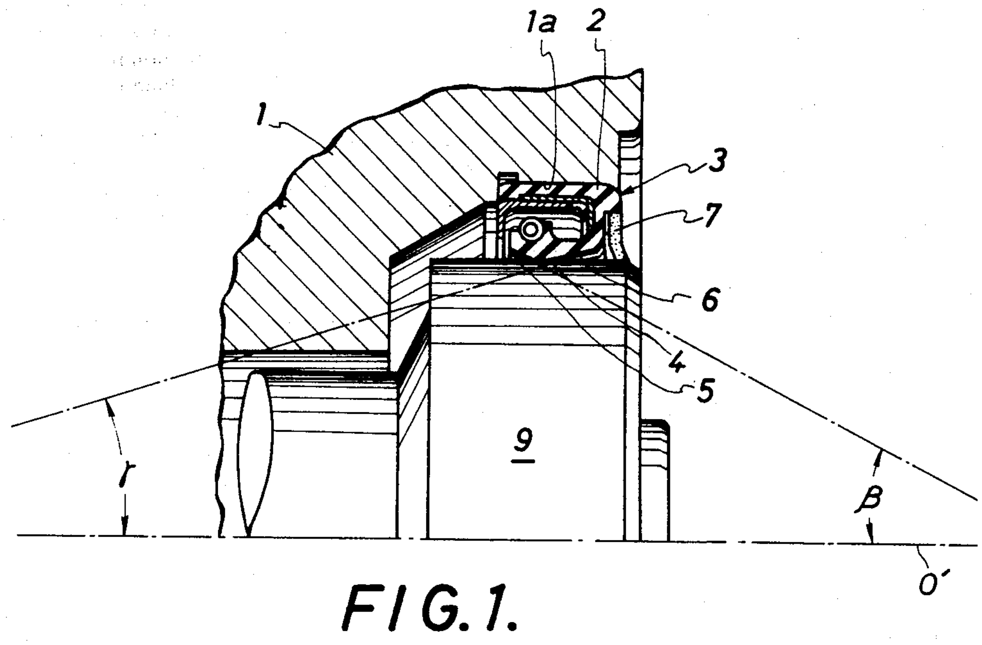
FIG. 1 is a sectional view of an oil seal having an outer peripheral surface fitted in a hole formed in the wall of a machine housing and a seal lip held in contact with the outer peripheral surface of a shaft extending through the hole in the machine housing wall so as to seal a liquid such as a lubricating oil filling the housing from the outside of the machine housing.

Referring to FIG. 1, an oil seal 3 having an outer peripheral portion of rubber is disposed between the inner peripheral surface of a hole 1*a* formed in the wall of a machine housing 1 and a shaft 9 such as a rotor shaft extending through the hole 1*a* so as to form an oil-tight seal to prevent the internal liquid such as a lubricating oil from leaking outside. More specifically, the oil seal 3 has a cylindrical outer peripheral portion 2 closely fitted in the inner peripheral surface of the hole 1*a* and a seal lip 4 extending radially inwardly from the outer peripheral portion 2 to make a resilient contact with the outer peripheral surface of the shaft 9 thereby to form the oil-tight seal. This type of oil seal is inherently unidirectional due to the specific form of the seal lip 4, so that it cannot perform the desired sealing function unless it is mounted in the right orientation on the machine housing 1. More specifically, as shown in FIG. 1, the unidirectionality of the oil seal is derived from the difference in shape between the oil-side annular tapered surface 5 and the air-side annular tapered surface 6 which are formed on the inner periphery of the seal lip 4. In order to effectively seal the liquid such as a lubricating oil filling the hole 1*a* in the machine housing 1, it is essential that the oil-side tapered surface 5 of the seal lip 4 be positioned correctly adjacent the oil side of the hole 1*a*. It will be seen that the leak of the oil to the outside will be enhanced if the oil seal is wrongly oriented to direct the oil-side tapered surface 5 to the air side, i.e. to the right side as viewed in FIG. 1, contrarily to the orientation shown in FIG. 1. As stated before, the outer peripheral portion 2 of the oil seal has a generally cylindrical form and there is no means for preventing the same from being seated in the hole 1*a* in the wrong orientation. It is, therefore, necessary to pay a specific attention to ensure the correct orientation of the oil seal during the mounting. This causes a serious problem particularly in the mass-production of the machine employing manual process for mounting the oil seal because it is quite beyond the human ability to perfectly eliminate the mounting in the wrong orientation. In fact, the wrong orientation of the oil seal is unavoidable even with the greatest attention of the worker, and the efficiency of the mounting work is seriously impaired due to a too much attention paid by the worker.

This problem, however, can be obviated by the present invention as will be fully realized from the following description of the preferred embodiment.

Figure 2:
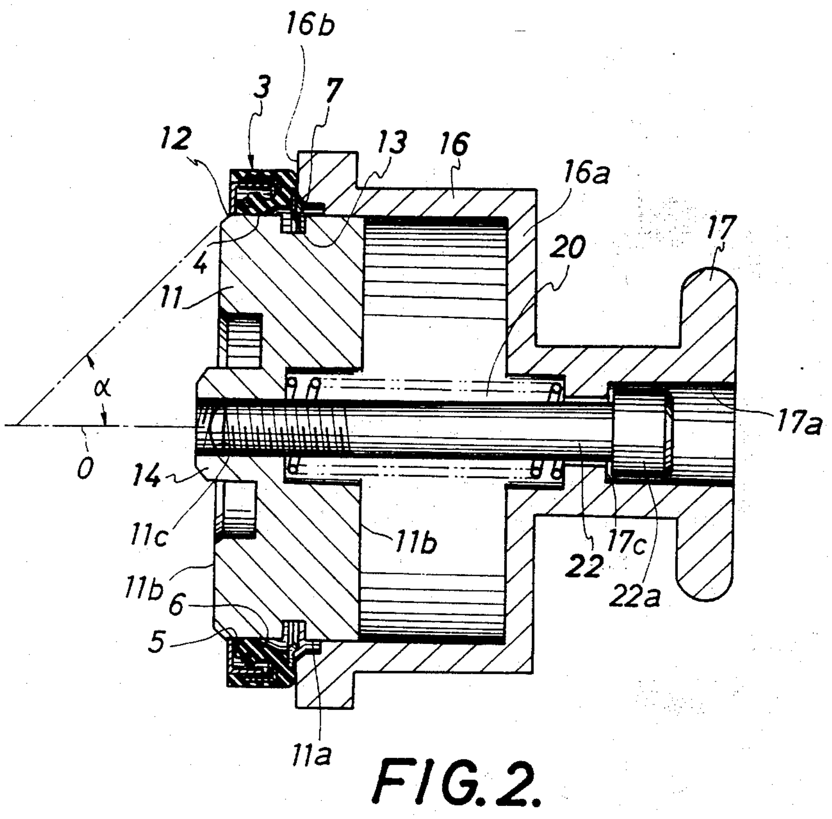
FIG. 2 is a sectional view of an oil seal mounting jig of the invention, carrying the oil seal in the right orientation.
Figure 3:
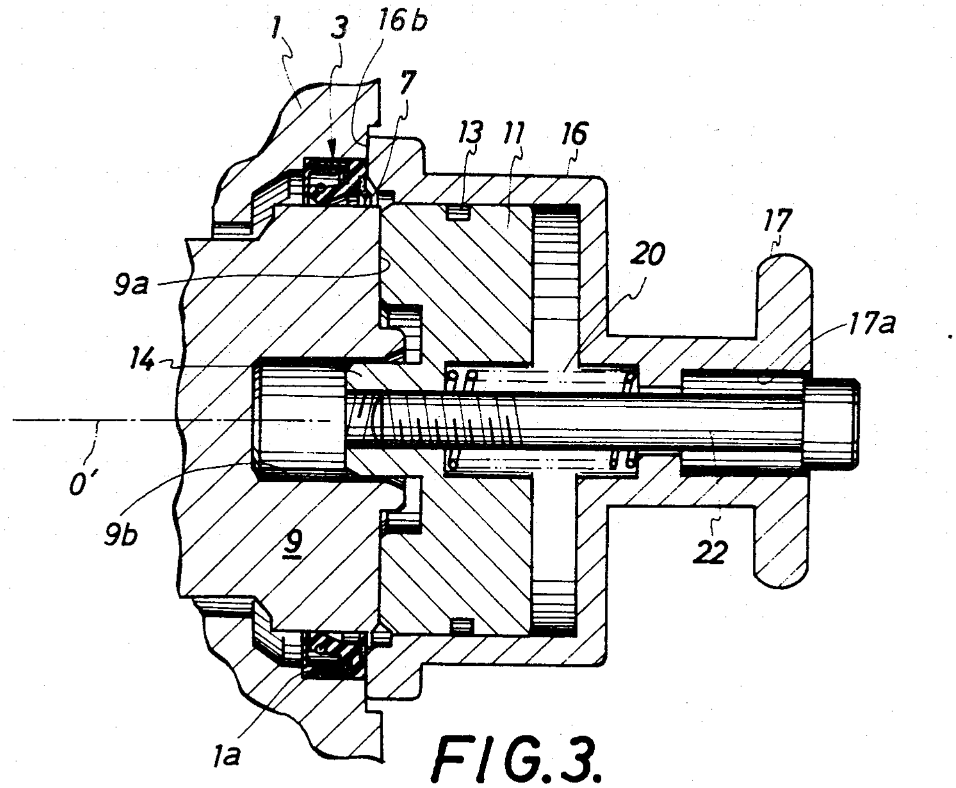
FIG. 3 is a sectional view of the oil seal mounting jig shown together with the oil seal which is being mounted on the machine housing.
Figure 4:
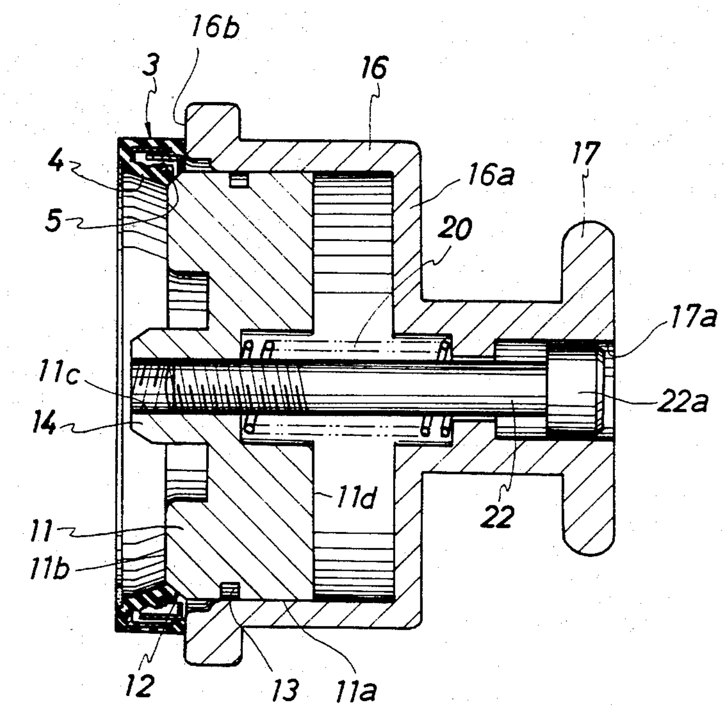
FIG. 4 is a sectional view of the oil seal mounting jig carrying the oil seal in the wrong orientation.

FIGS. 2 to 4 in combination show an oil seal mounting jig in accordance with the invention. The jig has a hollow cylinder 16 opened at its one end and closed at its other end. The hollow cylinder 16 axially slidably receives hub member 11 having a cylindrical outer peripheral surface 11*a* for mounting the oil seal 3. The hub member 11 has an outside diameter substantially equal to that of the shaft 9 such as a rotor shaft (see FIG. 1) around which the oil seal 3 is to be fitted. The outer end surface 11*b* of the hub member 11 is chamfered as at 12 to mate the oil-side tapered surface 5 (see FIG. 1) of the oil seal 3. Preferably, the inclination angle $\alpha$ of the chamfer, i.e. the angle formed between the generating line of the conical chamfered surface 12 and the axis O of the shaft 9, is selected to be substantially equal to or smaller than the inclination angle $\beta$ (see FIG. 1) of the oil-side tapered surface 5 of the oil seal 3, i.e. the angle formed between the generating line of the oil-side tapered surface 5 and the axis O′ (see FIG. 1) of the oil seal. It is also preferred that the angle $\beta$ is greater than the inclination angle $\gamma$ of the air-side tapered surface 6, i.e. the angle formed between the generating line of the air-side tapered surface 6 and the axis O′ of the oil seal 3.

The outer end surface 11*b* of the hub member 11 is provided at its central portion with a cylindrical locating boss 14 projecting axially outwardly therefrom. As will be seen from FIG. 3, the locating boss 14 is adapted to fit in an axial cylindrical locating hole 9*b* formed in the center 9*a* of one end surface of the shaft 9 on which the oil seal 3 is to be mounted. By fitting the locating boss 14 in the locating hole 9*b*, it is possible to correctly center and align the hub member 11 with respect to the shaft 9 during the mounting of the oil seal 3.

The hub member 11 is provided with a threaded bore 11*c* formed along the axis O thereof, for screwing engagement by one end of a retaining bolt or threaded rod 22 which extends through the end wall 16*a* of the cylinder 16. The other end of the bolt 22 extended outwardly from the end wall 16*a* is provided with an enlarged head portion 22*a* which is axially movably received in the enlarged portion of a stepped bore 17*a* formed to extend axially in a head portion formed on the center of the end wall 16*a* of the cylinder 16. A spring 20 such as a coiled spring is loaded between the end wall 16*a* of the cylinder 16 and the inner end surface 11*d* of the hub member 11 so as to surround the bolt 22. The spring 20 produces a predetermined force by which the hub member 11 is urged outwardly of the cylinder 16. The outward movement of the hub member 16 is prevented by the abutment between the enlarged head portion 22*a* of the bolt 22 and a shoulder portion 17*c* of the stepped bore 17*a* in the cylinder head 17.

Since the inclination angle $\gamma$ of the air-side tapered surface 6 of the oil seal is smaller than the inclination angle $\beta$ of the oil-side tapered surface 5, and since the seal lip 4 of the oil seal 3 is cantilevered at its end adjacent to the air-side tapered surface 6, the insertion of the hub member 11 into the oil seal 3 encounters a smaller resistance in a first case where the air-side tapered surface 6 is positioned adjacent to the cylinder 16 than in a second case where the oil-side tapered surface 5 is positioned adjacent to the cylinder 16. Therefore, the load of the spring 20 is so selected to be greater than the insertion resistance encountered in the first case but smaller than the insertion resistance encountered in the second case mentioned above.

A reference numeral 13 designates an annular groove formed in the outer peripheral surface 11*a* of the hub member 11 and adapted to be fitted by a dust lip 7 of the oil seal 3 when the latter is mounted on the outer peripheral surface 11*a* of the hub member 11.

The operation of this embodiment is as follows. As the first step, referring to FIG. 2, the oil seal 3 to be mounted is pressed at its air-side end by the hub member 11 of the oil seal mounting jig of the invention, so that the air-side tapered surface 6 on the seal lip 4 of the oil seal 3 is contacted by the chamfered portion. In this state, since the force of the spring 20 is selected to be greater than the insertion resistance encountered when the air-side tapered surface 6 of the oil seal 3 is positioned closer to the cylinder 16 than the oil-side tapered surface 5, the hub member is inserted into the seal lip 4 by the force of the spring 20 while expanding the latter radially outwardly by the chamfered portion 12 of the outer end surface 11*c* thereof, within the stroke limited by the enlarged head portion 22*a*. As the hub member 11 is inserted deeper into the seal lip 4, the dust lip 7 on the seal ring 3 comes into engagement with the annular groove 13 in the outer peripheral surface of the hub member 11 so that the movement of the hub member 11 is stopped. Then, as shown in FIG. 3, the locating boss 14 formed on the center of the outer end surface 11*a* of the hub member 11 is inserted into the locating hole 9*b* formed in the center of the axial end surface 9*a* of the shaft 9 which is beforehand suitably held in the housing 1, thereby to axially align the hub member 11 and the shaft 9 with respect to each other. Then, the head 17 of the cylinder 16 is pushed to move the cylinder forwardly with respect to the hub member 11, while compressing the spring 20 so that the seal ring 3 is pressed by the open end surface 16*b* of the cylinder 16 to slide along the outer peripheral surface 11*a* of the hub member 11 into the hole 1*a* formed in the wall of the machine housing 1. In this state, the outer peripheral portion 2 of the seal ring 3 closely fits the inner peripheral surface of the hole 1*a*.

Assume here that the oil seal 3 is mounted in the wrong orientation with respect to the oil seal mounting jig as shown in FIG. 4, i.e. in such an orientation that the oil side of the oil seal is positioned closer to the cylinder 16, the chamfered portion 12 makes a surface contact with the oil-side tapered surface 5 of the oil seal 3. The surface contact between the chamfered portion 12 of the hub member 11 and the oil-side tapered surface 5 of the seal lip 4 produces a large resistance against the inserting force. Since this resistance force is greater than the force of the spring 20 as explained before, the spring 20 is compressed by the resistance force exerted by the shaft member 11 as the head 17 of the cylinder 16 is pressed, so that the hub member 11 is retracted into the cylinder 16 failing to carry the oil seal 3 on the outer peripheral surface 11*a* thereof. Consequently, the oil seal 3 comes off from the mounting jig when the latter is moved to the position opposite to the housing 1. It is thus possible to prevent the oil seal 3 from being mounted in the hole 1*a* of the housing 1 in the wrong orientation.

In the preferred embodiment described hereinbefore, the series of operation including the fitting of the oil seal 3 on the oil seal mounting jig and the mounting of the oil seal 3 in the machine housing 1 is made by manual work. However, it will be clear to those skilled in the art that this series of operation can be made sequentially and automatically to include steps such as the supply of the oil seal 3, fitting of the oil seal 3 to the oil seal mounting jig, confirmation of the fitting, indexing of the oil seal mounting jig with respect to the machine housing, pressing of the cylinder 16, and so forth.

The spring 20 used in the described embodiment as a means for urging the hub member 11 outwardly of the cylinder 16 may be substituted by a suitable pneumatic spring. Such a pneumatic spring can be realized by confining compressed air in the closed chamber defined by the hub member 11 within the cylinder 16 such that the compressed air produces a force for outwardly urging the inner end surface 11*d* of the hub member 11.

The oil seal mounting jig of the invention, having the heretofore described construction, offers the following advantages peculiar thereto.

Namely, the oil seal mounting jig of the invention comprises; a hollow insertion cylinder opened at its one end and closed at its other end; a hub member for carrying the oil seal, the hub member being adapted to be slidingly received by the cylinder from the open end of the latter and having an outer peripheral surface of an outside diameter substantially equal to that of a shaft on which the oil seal is to be mounted, one end surface of the hub member having a chamfered portion adapted to abut the oil-side tapered surface of the oil seal; a spring means disposed between the hub member and the closed end surface of the cylinder and adapted to urge the hub member outwardly of the cylinder; and a stopper means for preventing the hub member from coming off from the cylinder due to the urging by the spring means.

Therefore, when the oil seal is fitted to the hub member of the oil seal mounting jig in the right orientation, i.e. with the air-side tapered surface of the oil seal positioned closer to the jig than the oil-side tapered surface, the chamfered portion of the end surface of the hub member does not closely contact the air-side tapered surface of the oil seal, so that the hub member can get into the lip portion of the oil seal while expanding the latter radially outwardly so that the oil seal can be carried by the outer peripheral surface of the hub member without substantial resistance. For mounting the oil seal in the machine housing, the outer end surface of the hub member of the oil seal mounting jig is brought into contact with the end surface of the shaft placed beforehand in the hole of the machine housing, and the cylinder of the oil seal mounting jig is pressed so that the open end surface of the cylinder presses the oil seal to slide the latter along the outer peripheral surface of the hub member. Consequently, the oil seal is mounted in the hole formed in the machine housing wall in the right orientation, i.e. with the oil-side tapered surface thereof directed inwardly of the machine housing.

To the contrary, when the oil seal is fitted to the hub member of the oil seal mounting jig erroneously with its oil-side tapered surface directed to the cylinder of the oil seal mounting jig, the chamfered portion of the hub member makes a surface contact with the oil-side tapered surface of the oil seal to produce a large resistance against the insertion of the hub member into the lip portion of the oil seal. Therefore, when the cylinder is pressed, the spring is compressed by the resistance force produced by the surface contact to allow the hub member to move into the cylinder, failing to fit the oil seal to the hub member of the oil seal mounting jig. Consequently, the mounting of the oil seal in the machine housing in the wrong orientation is avoided automatically.

According to the invention, it is thus possible to automatically ensure the right orientation of the oil seal mounted in the machine housing to permit an easy and efficient oil seal mounting work, while saving the human workers considerably, to a great advantage in the mass-production of machines incorporating an oil seal of the kind described.

Although the invention has been described through specific terms, it is to be noted here that the described embodiment is not exclusive and various changes and modifications may be imparted thereto without departing from the scope of the invention which is limited solely by the appended claims.

What is claimed is:

1. An oil seal mounting jig for mounting an oil seal in a hole formed in the wall of a machine housing such that the outer peripheral surface of said oil seal closely fits the inner peripheral surface of said hole, said oil seal being provided on the inner periphery thereof with an annular oil-side tapered surface for contact with the oil to be sealed and an air-side tapered surface having an inclination angle different from that of said oil-side tapered surface, said oil seal mounting jig comprising:

a hollow insertion cylinder opened at its one end and partially closed at its other end;

a hub member for carrying said oil seal and adapted to be slidingly received in said cylinder from the open end of the latter, said hub having an outer peripheral surface of an outside diameter substantially equal to that of a shaft on which said oil seal is to be mounted, one end surface of said hub member having its peripheral edge chamfered;

a spring means disposed between said hub member and the partially closed end wall of said cylinder and adapted to urge said hub member outwardly of said cylinder, the set load of said spring means being smaller than the resistance force encountered when said oil seal is fitted to said hub member with said oil-side tapered surface directed to said cylinder but greater than the resistance force encountered when said oil seal is fitted to said hub member with said air-side tapered surface directed to said cylinder; and a stopper means for preventing said hub member from coming off from said cylinder under the urge of said spring means.

2. An oil seal mounting jig as set forth in claim 1, wherein said spring means comprises a compression spring.

3. An oil seal mounting jig as set forth in claim 1, wherein said stopper means includes a rod connected at its one end to said hub member and extended at its other end slidably through a bore formed in the partially closed end wall of said cylinder, said other end of said rod being provided at its outer extremity with a head portion contactable with said partially closed end wall of said cylinder.

4. An oil seal mounting jig as set forth in claim 1, wherein said hub member is provided on the center of the outer end surface thereof with a locating boss capable of fitting in an axial locating hole formed in the end surface of said shaft along the axis of said shaft.

5. An oil seal mounting jig as set forth in claim 1, wherein said hub member is provided in the outer peripheral surface thereof with an annular groove adapted to receive a dust lip formed on said oil seal.

6. An oil seal mounting jig as set forth in claim 1, wherein the angle of the chamfered surface of the hub member with respect to the central axis of the hub member is equal to or smaller than the angle of the oil-side tapered surface of the oil seal with respect to the central axis of the oil seal, and greater than the angle of the air-side tapered surface of the oil seal with respect to the central axis of the oil seal.

7. An oil seal mounting jig ensuring the correct mounting of an unidirectional oil seal on a shaft and in a hole formed in the wall of a machine housing in which the shaft is disposed such that the outer peripheral surface of said oil seal closely fits the inner peripheral surface of said hole, said oil seal being provided on the inner periphery thereof with an annular oil-side tapered surface for contact with the oil to be sealed and an air-side tapered surface having an inclination angle different from that of said oil-side tapered surface, said oil seal mounting jig comprising:

- a hollow insertion cylinder opened at its one end and partially closed at its other end;
- a hub member for carrying said oil seal and adapted to be slidingly received in said cylinder from the open end of the latter, said hub having an outer peripheral surface of an outside diameter substantially equal to that of said shaft on which said oil seal is to be mounted, one end surface of said hub member having its peripheral edge chamfered;
- a spring means disposed between said hub member and the partially closed end wall of said cylinder and adapted to urge said hub member outwardly of said cylinder, said spring means being constructed so that the force to effect compression of said spring means is greater than the resistance force encountered when said oil seal is fitted onto said hub member in a first orientation in which said air-side tapered surface faces said cylinder such that said oil seal can be fitted onto said hub member in said first orientation as said spring means urges extension of said hub member outwardly of said cylinder, said spring means being further constructed so that the force to effect compression of said spring means is less than the resistance force encountered when said oil seal is fitted onto said hub member in a second orientation in which said oil-side tapered surface faces said cylinder such that said oil seal is precluded from being fitted onto said hub member in said second orientation as said spring means compresses to preclude sufficient extension of said hub member outside of said cylinder onto which said oil seal can be fitted; and
- a stopper means for preventing said hub member from coming off from said cylinder under the urge of said spring means.

8. The combination comprising a mounting jig which includes a hollow cylinder open at one end and partially closed at the other end, a hub member slidably received in said cylinder, a chamfered surface formed on the outer end of said hub member, spring means disposed between said hub member and the partially closed end wall of said cylinder urging said hub member outwardly of said cylinder, an oil seal having on the inner periphery thereof an annular oil-side tapered surface for contact with the oil to be sealed and an air-side tapered surface having an inclination angle different from that of said oil-side tapered surface, said spring means being constructed so that the force to effect compression of said spring means is greater than the resistance force encountered when said oil seal is fitted onto said hub member in a first orientation in which said air-side tapered surface faces said cylinder such that said oil seal can be fitted onto said hub member in said first orientation as said spring means urges extension of said hub member outwardly of said cylinder, said spring means being further constructed so that the force to effect compression of said spring means is less than the resistance force encountered when said oil seal is fitted onto said hub member in a second orientation in which said oil-side tapered surface faces said cylinder such that said oil seal is precluded from being fitted onto said hub member in said second orientation as said spring means compresses to preclude sufficient extension of said hub member outside of said cylinder onto which said oil seal can be fitted.

9. The combination as set forth in claim 8, wherein the angle of said chamfered surface of the hub member with respect to the central axis of the hub member is equal to or smaller than the angle of the oil-side tapered surface of the oil seal with respect to the central axis of the oil seal, and greater than the angle of the air-side tapered surface of the oil seal with respect to the central axis of the oil seal.

10. A method of ensuring the correct mounting of an unidirectional oil seal in a machine housing comprising biasing a hub member to extend outwardly beyond the end of a cylinder in which said hub member is slidable with a biasing force which is greater than the resistance encountered when said oil seal is fitted onto said hub member in a first orientation in which one side of said oil seal faces said cylinder, fitting said oil seal onto said hub member in said first orientation as said spring means urges extension of said hub member outwardly of said cylinder, transferring said oil seal from said hub member onto said machine housing such that the oil seal is thereby mounted in said machine housing in the ensured correct orientation as determined by the fact that the oil seal is capable of being fitted onto said hub member, attempting to fit an oil seal member onto said hub member in a second orientation in which the other side of said oil seal faces said cylinder, precluding fitting of said seal member onto said hub member by biasing said hub member with a biasing force which is less than the resistance encountered when said oil seal is attempted to be fitted onto said hub member in said second orientation, indicating that said second orientation is the incorrect orientation by the fact that the oil seal is incapable of being fitted onto said hub member, and reversing the disposition of the oil seal from said second orientation to said first orientation so that said oil seal is thereby capable of being fitted onto said hub member and subsequently transferred into and correctly assembled in said machine housing in the ensured correct orientation.

* * * * *